Oct. 9, 1928.
J. H. CONE
1,686,652
ELECTRICAL MEASURING INSTRUMENT
Filed Oct. 20, 1927
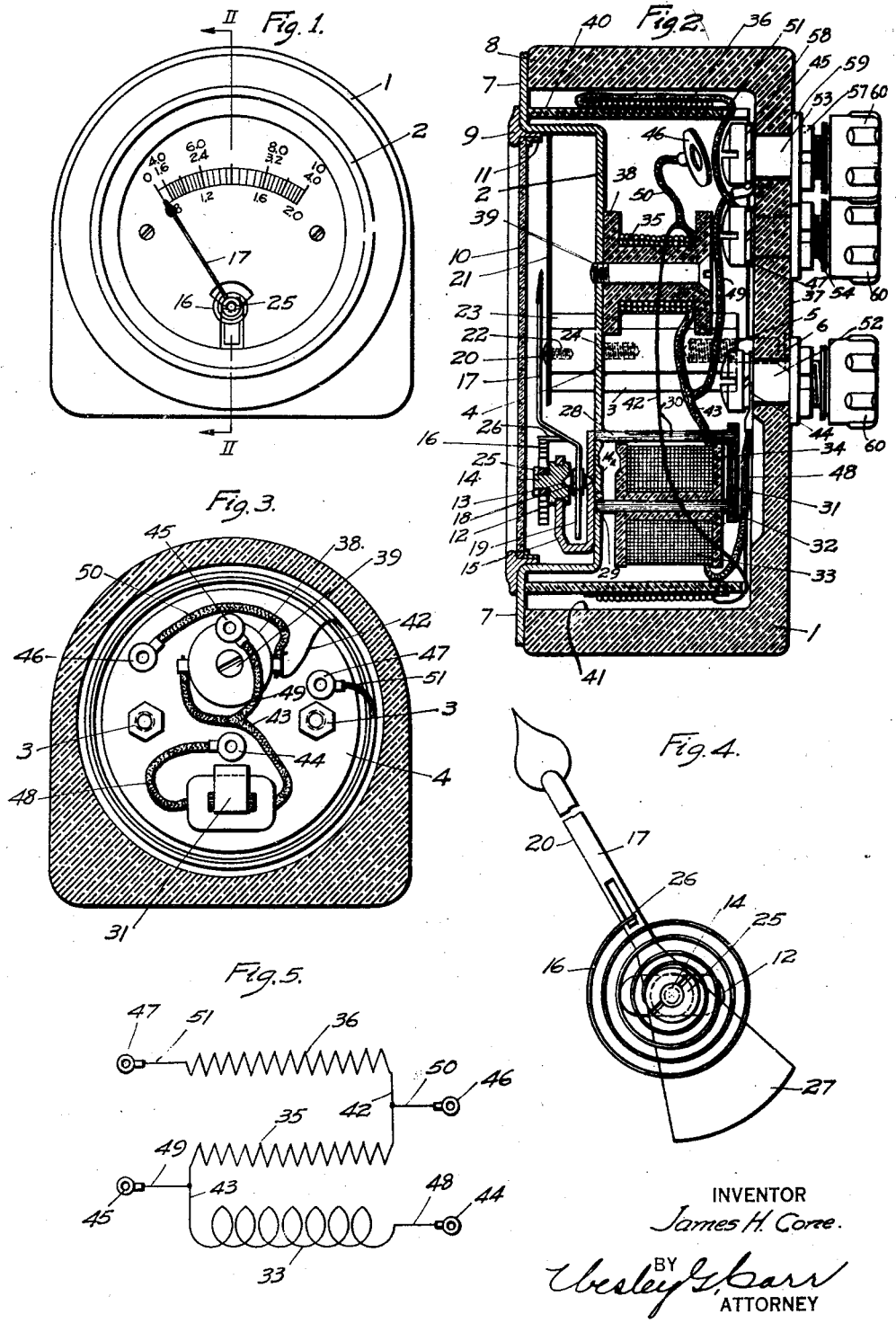
INVENTOR
James H. Cone.
BY
Wesley G. Carr
ATTORNEY Patented Oct. 9, 1928.

1,686,652

UNITED STATES PATENT OFFICE.

JAMES H. CONE, OF ROSELAND, NEW JERSEY, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed October 20, 1927. Serial No. 227,405.

My invention relates to electrical measuring instruments and more particularly to ammeters and voltmeters of the small-vane type.

My invention resides in indicating apparatus responsive to the magnitude of an electrical quantity and it is characteristic of my apparatus for this purpose that it is adaptable, without material alteration, to the measurement of either alternating or direct currents and to the measurement of a plurality of widely differing ranges of magnitude of such quantities.

It is further characteristic of my invention that apparatus constructed in accordance therewith is relatively inexpensive to manufacture and repair.

Briefly stated, apparatus constructed in accordance with my invention, in addition to, and as a result of, such inexpensive design, possesses several novel features, to wit, a movement-resisting spring mounted externally with respect to the bearings thereof; an auxiliary casing having space provided therein for coils and resistors; and a resistor conforming, in configuration, to and disposed near the inner wall of, said casing.

Such novel features are directed to means for providing an accurate measuring instrument where available space is relatively small.

My invention resides also in the apparatus of the character hereinafter described and claimed, the foregoing and further characteristics of my invention being determinable from the following description.

For an understanding of a form my apparatus may take, reference is to be had to the accompanying drawings, in which;

Figure 1 is a view, in front elevation, of an electrical measuring instrument constructed in accordance with my invention;

Fig. 2 is an enlarged sectional view of the instrument shown in Fig. 1 taken on the line II—II;

Fig. 3 is a back elevational view, partially in cross section, of the device shown in Fig. 1;

Fig. 4 is an enlarged plan view of the armature and shaft assembly of the instrument shown in Fig. 1; and Fig. 5 is a diagrammatic view of the electrical circuit of the instrument shown in Fig. 1.

Referring to Figs. 1 to 3, inclusive, an electrical measuring instrument, constructed in accordance with my invention, comprises a casing 1 preferably molded of suitable insulating material for the reception of another casing 2 adapted to house the movable and indicating members in their proper respective positions. The casing 2 is adapted to fit snugly within the casing 1, and the latter is maintained in its proper position by studs 3 that are mounted on the inner portion 4 of the casing 2 and are, in turn, engaged by screws 5 that extend, preferably, through openings 6 of the casing 1 and occupy countersunk spaces therein.

The casing 2 comprises a member of substantially cup-shape having a laterally extending flange 7 that co-operatively engages the front surface 8 of the casing 1. The substantially circular portion, bounded by the flange 7, is adapted to co-operatively engage a rim 9 to retain a glass window in position. The glass window 10 may be retained in the rim 9 in any suitable manner, as, for example, by an inner ring 11 that is frictionally retained in position within the inner periphery of the rim 9. The rim 9 is removably fitted within the casing 2 and may be detached at any time for inspection or repair of the apparatus.

The aforesaid apparatus comprises an elliptically shaped magnetizable vane 12 that is mounted on a shaft 13 which is adapted to rotate between bearings 14 and 14ª. A member 15 of substantially U-shape is secured, preferably, to the casing 2 and provides a support for the bearings and the movement-restraining spring 16 of the armature 12. A pointer 17 is secured to the shaft 13 in any suitable manner, as, for example, by a member 18 cooperating with the magnetizable vane 12. The pointer 17 comprises two portions 19 and 20 that are disposed in different substantially parallel planes so that the portion 20 shall coact with, or freely turn in front of, a suitable calibrated dial plate 21. The dial plate 21 may be secured in position in any suitable manner, but I prefer to secure the latter in position by screws 22 mounted in spacing members 23, in turn, secured to the members 3 and the inner portion 4 of the casing 2. The spacers 23 are provided, preferably, with threaded studs 24 adapted to cooperatively engage corresponding threaded openings in the members 3.

The spring 16, preferably spiral, is mounted on a collar-like member 25 diametrically slotted throughout a portion of its length and ordinarily comprising copper, bronze or some other suitable soft metallic material. Member 25 is fitted over the end of bearing 14 and the slotted portions thereof pressed toward each other. The spiral spring 16 is preferably disposed in substantially the same plane as that occupied by the portion 20 of the pointer 17, and the two are secured together in any suitable manner, as, for example, by an up-struck member 26 of the pointer 17 to which the spring 16 is secured, as shown in Fig. 4. The portion 20 of the pointer 17 is balanced by a portion 27 of wing shape that is disposed on the opposite side of the shaft 13.

The magnetizable vane 12 is energized by magnetic flux traversing the tips 28 and 29 of a laminated core structure comprising three sections 30, 31 and 32 that are secured together at substantially right angles to each other. Each of the laminated sections 30, 31 and 32 comprises a plurality of flat magnetizable iron plates that are dovetailed or soldered together in any suitable manner.

A coil 33 is preferably wound on a spool 34 of suitable insulating material mounted on the section 32 of the laminated core. The coil sends a flux between the tips 28 and 29 that is proportional to the current traversing said coil.

The magnetizable vane 12 is so secured to the shaft 13 as to have its short axis substantially at right angles to lines of magnetic flux passing between the magnetizable tips 28 and 29 of the core when the pointer 17 is substantially at a zero position. The magnetizable vane tends to take a position whereby its long axis shall be in alinement with said lines. As the magnetic flux between the tips 28 and 29 is increased, the spring 16 restrains such motion, and the pointer 17 takes a position dependent upon the magnitude of the flux passing between the tips 28 and 29.

In series-circuit relation with the coil 33, are resistors 35 and 36 that may be suitably disposed between the inner wall 4 of the casing 2 and the rear wall 37 of the auxiliary housing 1. For example, the resistor 35 is wound on an insulating spool 38 that is secured to the rear wall 4 of the casing 1 by a bolt 39 that is secured to the former.

The resistor 36 is wound in a coil about a member 40, the configuration of which conforms substantially to that of the inner wall 41 of the casing 1. In such manner the coil 36 is made to occupy a position near the inner wall 4 of the casing 1. The member 40 may be made of any suitable material, but I prefer that it shall be a section of micarta tubing. In assembly, the resistor 36 is wound on the outer periphery of the member 40, and the assembled resistor 36 and the member 40 are forced snugly into position within the casing 1. I consider such disposition of the resistor 36 in the manner outlined above, to be particularly novel and especially useful where a saving in space, as in the small electrical instrument under consideration, is necessary. By positioning the resistor near the outer wall of the casing, a great saving in space is effected and such resistors may be added in layers and tapped off in any suitable manner. In the example shown, only one resistor is wound and disposed in such manner but it may readily be seen that several layers of resistor coils may be disposed near the inner periphery of the walls of a measuring instrument casing.

The resistors 35 and 36 and the electromagnetic coil 33 may be electrically connected in any suitable manner, as, for example, by insulated conductors 42 and 43. The electrical circuit of the resistors and the electromagnetic coil 33 is provided with a plurality of terminals 44, 45, 46 and 47 that are connected by suitable leads 48, 49, 50 and 51 to various points in the circuit, whereby a predetermined resistance may be inserted in series-circuit relation with the coil 33. The terminals 44, 45, 46 and 47 are secured to terminal studs mounted on the rear wall 37 of the casing 1 in any suitable manner, as, for example, by screw bolts 52, 53, 54 and 55, respectively. The bolts pass through openings of suitable shape in the rear wall 37 of the casing 1 and are secured in position by nuts 57. Lock washers 58 are disposed between terminals and the heads of the bolts, and washers 59 are disposed, preferably, between the wall 37 and the nuts 57. Thumb screws 60 are mounted on the outer ends of the bolts 52, 53, 54 and 55 in order to effect a convenient connection to external conductors.

In the example shown, the instrument is to be used as a voltmeter, and the scale of the latter is calibrated to indicate the electromotive force impressed across the terminals of the instruments in scales of three different ranges; for example, zero to 2 volts, zero to 4 volts and zero to 10 volts, their use depending upon which terminals are utilized. In the circuit connections shown, if an electromotive force is impressed across the terminals 44 and 45, the pointer 17 indicates on the lower scale, i. e., the scale from zero to 2 volts. When the electromotive force is impressed across the terminals 44 and 46 the resistor 35 will be in series-circuit relation with the electromagnetic coil 33 and the pointer will, therefore, indicate on the immediate scale, i. e., the scale between zero and 4 volts, the voltage across the terminals 44 and 46. In a similar manner, when the terminals 44 and 47 are utilized, both the resistors 35 and 36 will be in series-circuit relation with the electromagnetic coil 33, and the pointer 17 will indicate, by its position with respect to the upper scale, i. e., the scale between zero and 10 volts, the voltage across the terminals 44 and 47.

It will be readily understood that the auxiliary casing may be entirely omitted when the device is to be used as an ammeter because of the nonuse of the resistors.

Apparatus constructed in accordance with my invention is particularly applicable to relatively small measuring instruments where spaces within the casings of the instruments are very limited.

While novel features of my invention may be embodied in large instruments, they are particularly applicable to relatively small instruments, especially the novel disposition of the resistor 36 around the inner wall of the casing 1; the laminated sections 30, 31 and 32 of the core; and the novel method of restraining the movement of the magnetizable member 12 by mounting the spring 16 on the bearing member 14 and securing the spring to the pointer 17.

Apparatus constructed in accordance with my invention may be embodied in a milliammeter as well as in ammeters and voltmeters.

Various modifications may be made in my invention without departing from the spirit and scope of the appended claims.

I claim as my invention:

1. In combination, an electrical measuring instrument having a casing, an auxiliary device therefor comprising a cup shaped member of insulating material, said cup shaped member having an opening for the reception of said casing and means for retaining said casing in position, a coiled resistor for said instrument secured to said casing, and another resistor disposed within said cup shaped member and having a shape conforming to the shape of the inner walls thereof.

2. In combination, an electrical measuring instrument having a casing, an auxiliary device therefor comprising a cup shaped member of insulating material, said cup shaped member having an opening for the reception of said casing and means for retaining said casing in position, a coiled resistor for said instrument secured to said casing, another resistor disposed within said cup shaped member and having a shape conforming to the shape of the inner walls thereof, terminal members extending through said cup shaped member, and means for connecting said terminals to said instrument and said resistors.

3. In combination, an electrical measuring instrument having a casing, resistor and magnetizing coils mounted on said casing, an auxiliary device for said instrument comprising a cup shaped member for housing all except the front of said casing, and a resistor coil wound on a hollow form conforming with the configuration of the inner walls of said cup shaped member, said resistor coil being mounted between said casing and the inner walls of said cup shaped member.

In testimony whereof, I have hereunto subscribed my name this 1st day of October, 1927.

JAMES H. CONE.